US012602004B2

(12) United States Patent
Morishita

(10) Patent No.: US 12,602,004 B2
(45) Date of Patent: Apr. 14, 2026

(54) IMAGE FORMING APPARATUS

(71) Applicant: KYOCERA Document Solutions Inc., Osaka (JP)

(72) Inventor: Hiroki Morishita, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 19/050,822

(22) Filed: Feb. 11, 2025

(65) Prior Publication Data

US 2025/0264842 A1 Aug. 21, 2025

(30) Foreign Application Priority Data

Feb. 16, 2024 (JP) ................................ 2024-022006

(51) Int. Cl.

*G03G 15/00* (2006.01)
*G03G 15/16* (2006.01)
*G03G 21/16* (2006.01)

(52) U.S. Cl.

CPC ......... *G03G 21/1647* (2013.01); *G03G 15/80* (2013.01); *G03G 21/1633* (2013.01); *G03G 21/1638* (2013.01); *G03G 21/168* (2013.01); *G03G 2221/169* (2013.01)

(58) Field of Classification Search

CPC .......... G03G 15/0189; G03G 15/1605; G03G 15/1675; G03G 15/80; G03G 21/1633; G03G 21/1638; G03G 21/1647; G03G 21/1652; G03G 21/168; G03G 2215/00544; G03G 2221/169

See application file for complete search history.

(56) References Cited

U.S. PATENT DOCUMENTS

2011/0110685 A1* 5/2011 Sato .................... G03G 21/168 399/121

FOREIGN PATENT DOCUMENTS

JP 2009-026656 A 2/2009
JP 2016-173404 A 9/2016

* cited by examiner

*Primary Examiner* — Sophia S Chen
(74) *Attorney, Agent, or Firm* — Studebaker Brackett PLLC

(57) ABSTRACT

An image forming apparatus includes a body housing, an opening and closing unit, an image carrier, a transfer roller, a power supply line, a power supply line side contact and a transfer roller side contact. The body housing has an opening. The opening and closing unit can be opened and closed in the opening. The image carrier is provided in the body housing. The transfer roller is provided in the opening and closing unit. The power supply line includes a first contact, and a second contact. The opening and closing unit includes a contact portion which comes into contact with the second contact and moves the second contact. The contact portion makes the second contact come into contact with the first contact when the opening and closing unit is closed, and makes the second contact separate from the first contact when the opening and closing unit is opened.

4 Claims, 7 Drawing Sheets

IMAGE FORMING APPARATUS

INCORPORATION BY REFERENCE

This application is based on and claims the benefit of priority from Japanese patent application No. 2024-022006 filed on Feb. 16, 2024, which is incorporated by reference in its entirety.

BACKGROUND

The present disclosure relates to an image forming apparatus.

Generally, a casing of an image forming apparatus is provided with an openable and closable cover. By opening the cover, it is possible to replace a unit and remove a sheet clogged in a conveyance path. Here, assuming an image forming apparatus having a function of separating a transfer roller from an image carrier when the cover is opened, an electric contact is provided in an electric path for supplying power to the transfer roller, and the electric contact is disconnected in conjunction with a separation of the transfer roller. In addition, in order to prevent a short circuit when the user's hand touches the electric contact, a high-voltage power supply board is controlled so that a high voltage is not applied to the electric path when the transfer roller is separated. In addition, in case a high-voltage power supply board becomes uncontrollable, an interlock switch is provided which is interlocked with the opening and closing of the cover.

However, since the interlock switch is expensive, it is difficult to reduce the cost of the image forming apparatus.

SUMMARY

An image forming apparatus according to the present disclosure includes a body housing, an opening and closing unit, an image carrier, a transfer roller, a power supply line, a power supply line side contact and a transfer roller side contact. The body housing has an opening. The opening and closing unit can be opened and closed in the opening. The image carrier is provided in the body housing, and carries a toner image. The transfer roller is provided in the opening and closing unit, comes into contact with the image carrier when the opening-and-closing unit is closed, and separates from the image carrier when the opening-closing unit is opened. The power supply supplies power to the transfer roller. The power supply line side contact is provided at an end portion of the power supply line. The transfer roller side contact is provided in the transfer roller, comes into contact with the power supply line side contact when the opening-and-closing unit is closed, and separates from the power supply line side contact when the opening-closing unit is opened. The power supply line includes a first contact, and a second contact which can be in contact with the first contact and separate from the first contact. The opening and closing unit includes a contact portion which comes into contact with the second contact and moves the second contact. The contact portion makes the second contact come into contact with the first contact when the opening and closing unit is closed, and makes the second contact separate from the first contact when the opening and closing unit is opened.

The above and other objects, features, and advantages of the present disclosure will become more apparent from the following description when taken in conjunction with the accompanying drawings in which a preferred embodiment of the present disclosure is shown by way of illustrative example.

BRIEF DESCRIPTION OF THE DISCLOSURE

Hereinafter, with reference to the drawings, an image forming apparatus 1 according to an embodiment of the present disclosure will be described.

Figure 1:
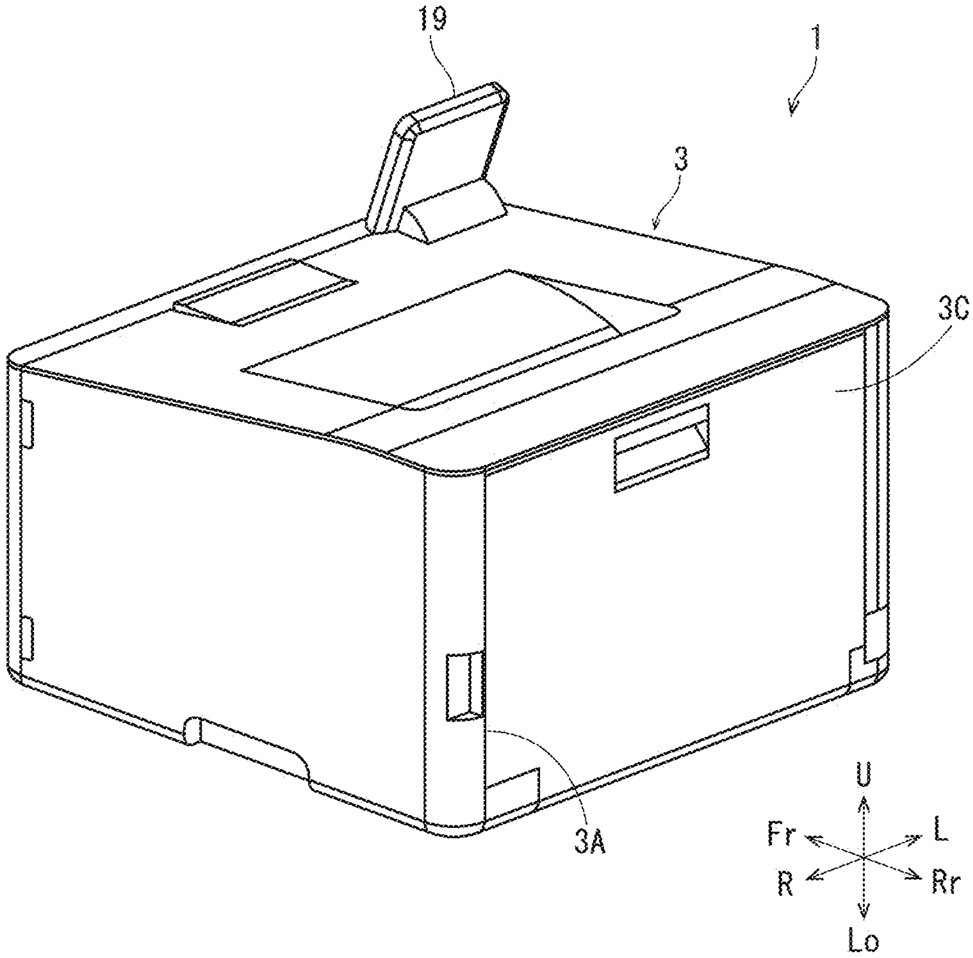
FIG. 1 is a perspective view showing an external appearance of an image forming apparatus according to one embodiment of the present disclosure.
Figure 2:
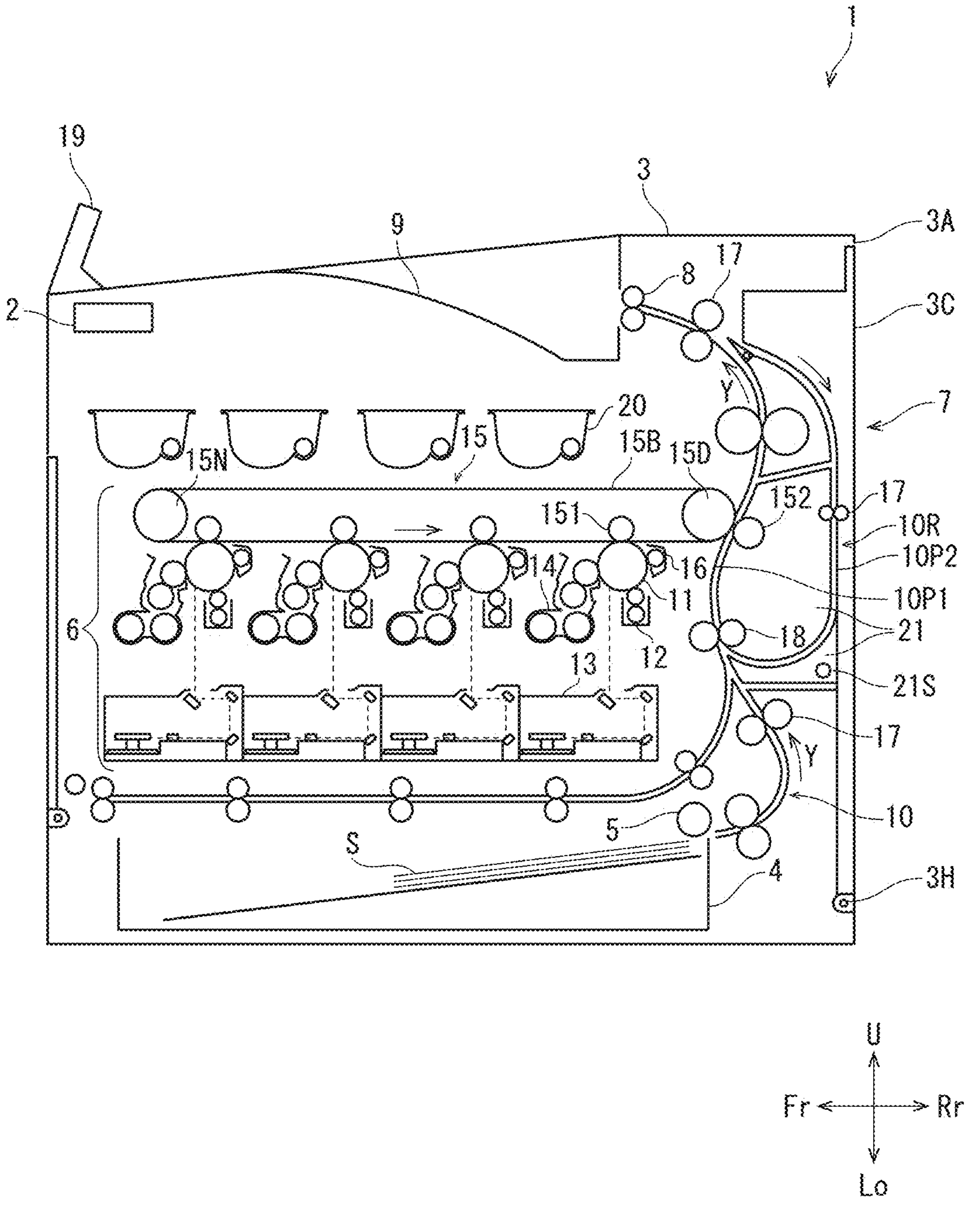
FIG. 2 is a side view schematically showing an internal structure of the image forming apparatus according to the embodiment of the present disclosure.

First, the entire structure of the image forming apparatus 1 will be described. FIG. 1 is a perspective view showing an external appearance of the image forming apparatus 1. FIG. 2 is a side view schematically showing the internal structure of the image forming apparatus 1. Hereinafter, the left side of the paper plan on which FIG. 2 is drawn is defined as the front side of the image forming apparatus 1, and the right-and-left directions will be described with reference to the direction in which the image forming apparatus 1 is viewed from the front side. In each figure, U, Lo, L, R, Fr, and Rr indicate the upper, lower, left, right, front, and rear, respectively.

The image forming apparatus 1 includes a rectangular parallelepiped body housing 3. In the lower portion in the body housing 3, a sheet feeding cassette 4 in which a sheet S is stored and a sheet feeding roller 5 which feeds the sheet S from the sheet feeding cassette 4 are provided. Above the sheet feeding cassette 4, an image forming device 6 which forms a toner image in an electrophotographic manner is provided, and a fixing device 7 which fixes the toner image to the sheet S is provided on the rear and upper side of the image forming device 6. A discharge roller 8 which discharges the sheet S to which the toner image is fixed and a discharge tray 9 on which the discharged sheet S is stacked are provided above the fixing device 7.

Inside the body housing 3, a conveyance path 10 is formed from the sheet feeding roller 5 through the image forming device 6 and the fixing device 7 to the discharge roller 8 is provided. The conveyance path 10 is formed mainly of plate-like members facing each other with a gap for passing the sheet S, and a conveyance roller 17 for holding and conveying the sheet S are provided at a plurality of positions in the conveyance direction Y. A registration roller 18 is provided on the upstream side of the image forming device 6 in the conveyance direction Y. An inversion conveyance path 10R branching from the conveyance path 10 on the downstream side of the fixing device 7 in the conveyance direction Y and merging with the conveyance path 10 on the upstream side of the registration roller 18 in the conveyance direction Y is provided on the rear side of the fixing device 7.

The image forming device 6 includes photosensitive drums 11 whose potential change by irradiation with light, charging devices 12 which charge the photosensitive drums 11, exposure devices 13 which emit laser light corresponding to image data, developing devices 14 which supply toner to the photosensitive drums 11, an intermediate transfer unit 15 which transfers the toner image from the photosensitive drums 11 to the sheet S, and cleaning devices 16 which remove the toner remaining on the photosensitive drums 11. The intermediate transfer unit 15 includes an endless intermediate transfer belt 15B wound around a driving roller 15D and a driven roller 15N, primary transfer rollers 151 facing the inner circumferential surface of the intermediate transfer belt 15B at positions corresponding to the photosensitive drums 11 and generating a primary transfer bias, and a secondary transfer roller 152 facing the outer circumferential surface of the intermediate transfer belt 15B at a position corresponding to the driving roller 15D and generating a secondary transfer bias. Toner containers 20 which supply the toner to the developing devices 14 are connected to the respective developing devices 14.

The control part 2 includes an arithmetic part and a storage part (not shown). The arithmetic part is, for example, a CPU (Central Processing Unit). The storage part includes a storage medium such as ROM (Read Only Memory), RAM (Random Access Memory), and EEPROM (Electrically Erasable Programmable Read Only Memory). The arithmetic part reads and executes control program stored in the storage part to perform various processes. The control part 2 may be implemented by an integrated circuit that does not use software.

An operation panel 19 is provided on the upper surface of the body housing 3. The operation panel 19 includes a display panel, a touch panel superposed on the display surface of the display panel, and a keypad adjacent to the display panel (not shown). The control part 2 causes the display panel to display a screen showing an operation menu, a status or the like of the image forming apparatus 1, and controls each part of the image forming apparatus 1 according to an operation detected by the touch panel and the keypad.

The basic image forming operation of the image forming apparatus 1 is as follows. When a single-sided printing job is input to the image forming apparatus 1 from an external computer or the like, the sheet feeding roller 5 feeds the sheet S from the sheet feeding cassette 4 to the conveyance path 10, the registration roller 18 whose rotation is stopped corrects the skew of the sheet S, and the registration roller 18 feeds the sheet S to the image forming device 6 at a predetermined timing. In the image forming device 6, the charging devices 12 charge the photosensitive drums 11 to a predetermined potential, the exposure devices 13 write electrostatic latent images on the photosensitive drums 11, the developing devices 14 develop the electrostatic latent images using the toner supplied from the toner containers 20 to form toner images, the primary transfer rollers 151 transfer the toner images to the intermediate transfer belt 15B, and the secondary transfer roller 152 transfers the toner images to the sheet S. Subsequently, the fixing device 7 fixes the toner image to the sheet S by melting the toner image while holding and conveying the sheet S, and the discharge roller 8 discharges the sheet S to the discharge tray 9. The cleaning devices 16 removes the toner remaining on the photosensitive drums 11. In the case of double-sided printing, the sheet S on which the toner image is fixed on the first surface is fed to the conveyance path 10 via the inversion conveyance path 10R, whereby the toner image is transferred to the second surface.

Figure 3:
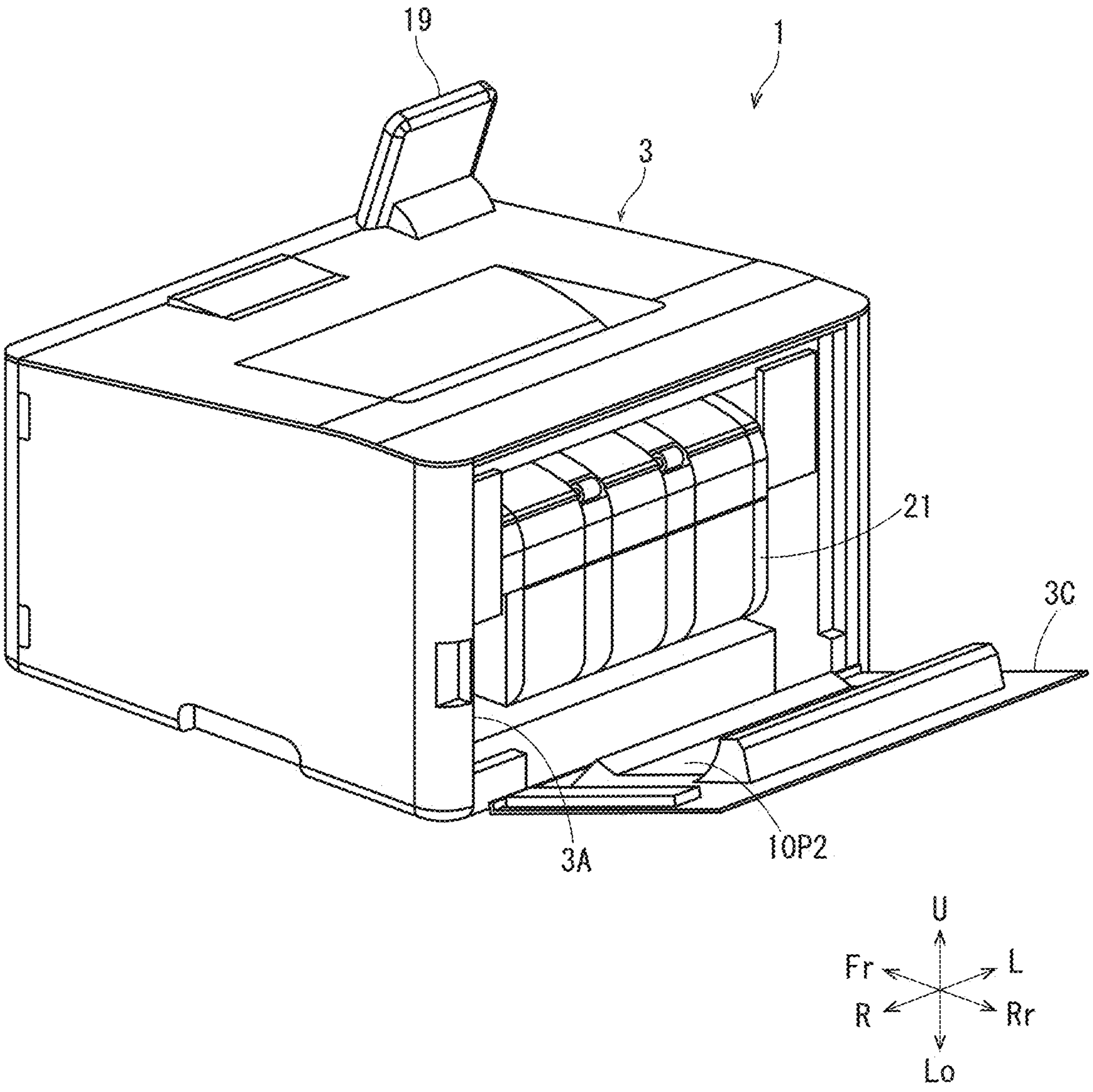
FIG. 3 is a perspective view showing an open state of a cover according to the embodiment of the present disclosure.
Figure 4:
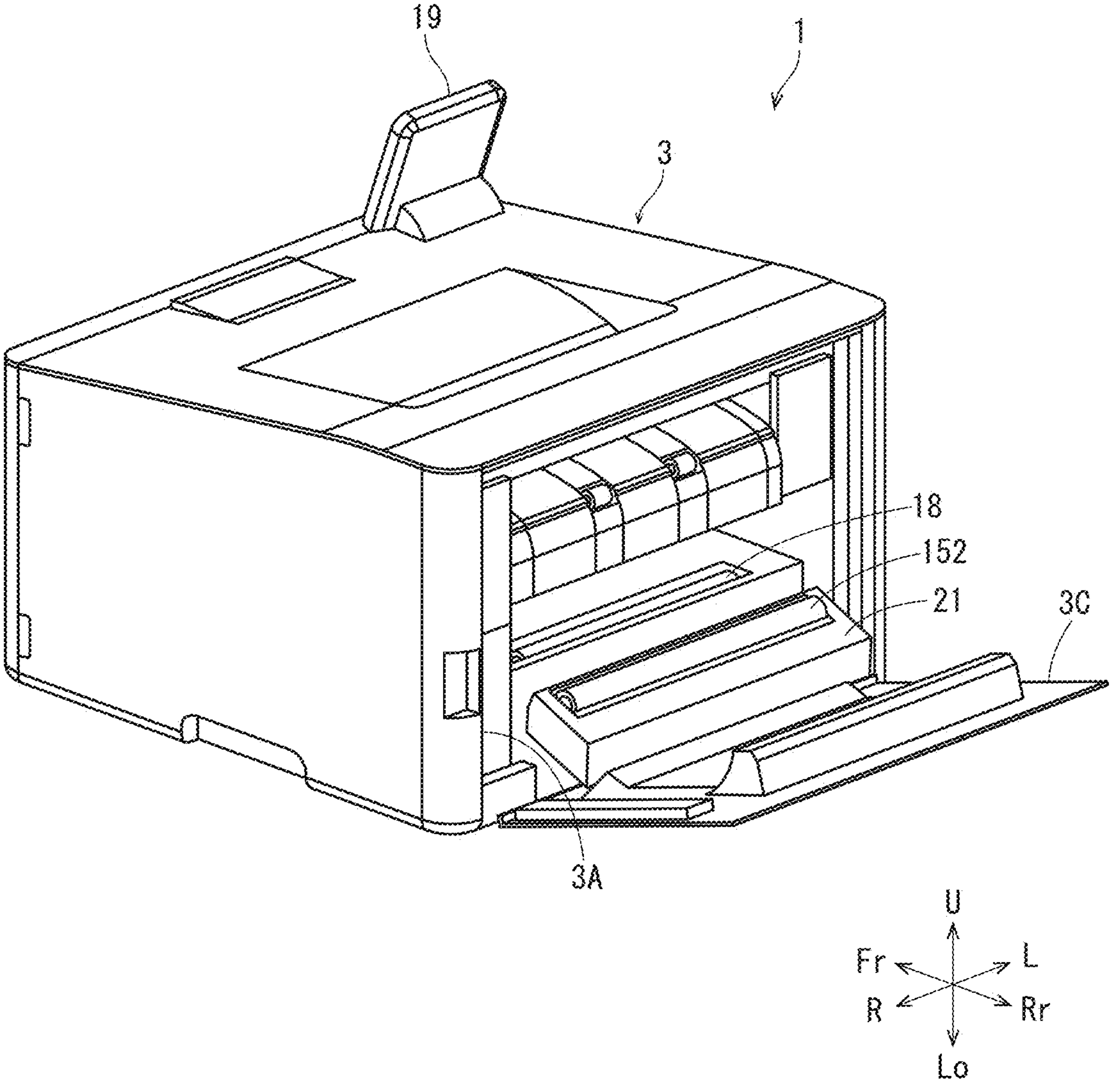
FIG. 4 is a perspective view showing an open state of an opening and closing unit according to the embodiment of the present disclosure being opened.
Figure 5:
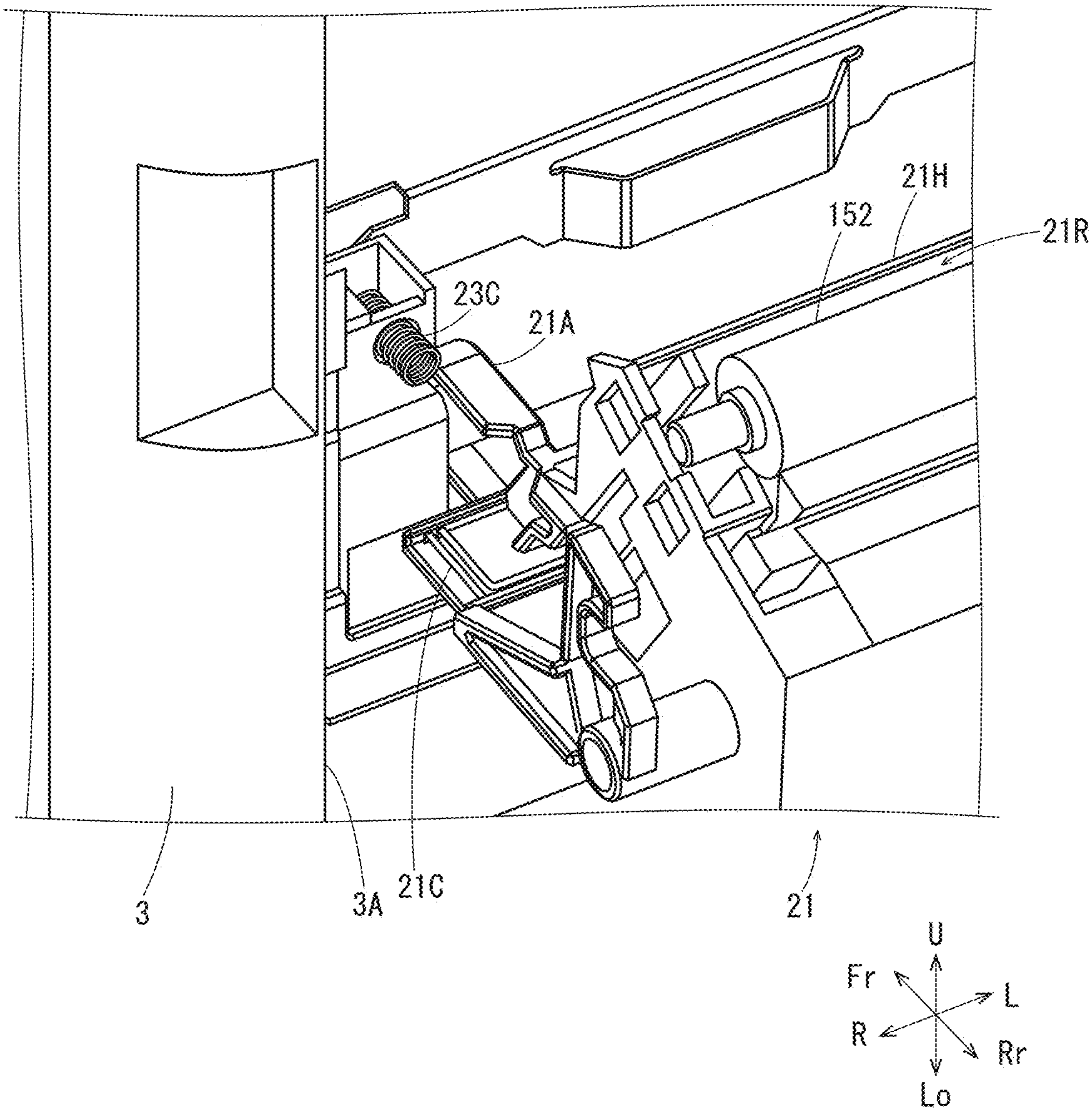
FIG. 5 is a perspective view showing the open state of the opening and closing unit according to the embodiment of the present disclosure.
Figure 6:
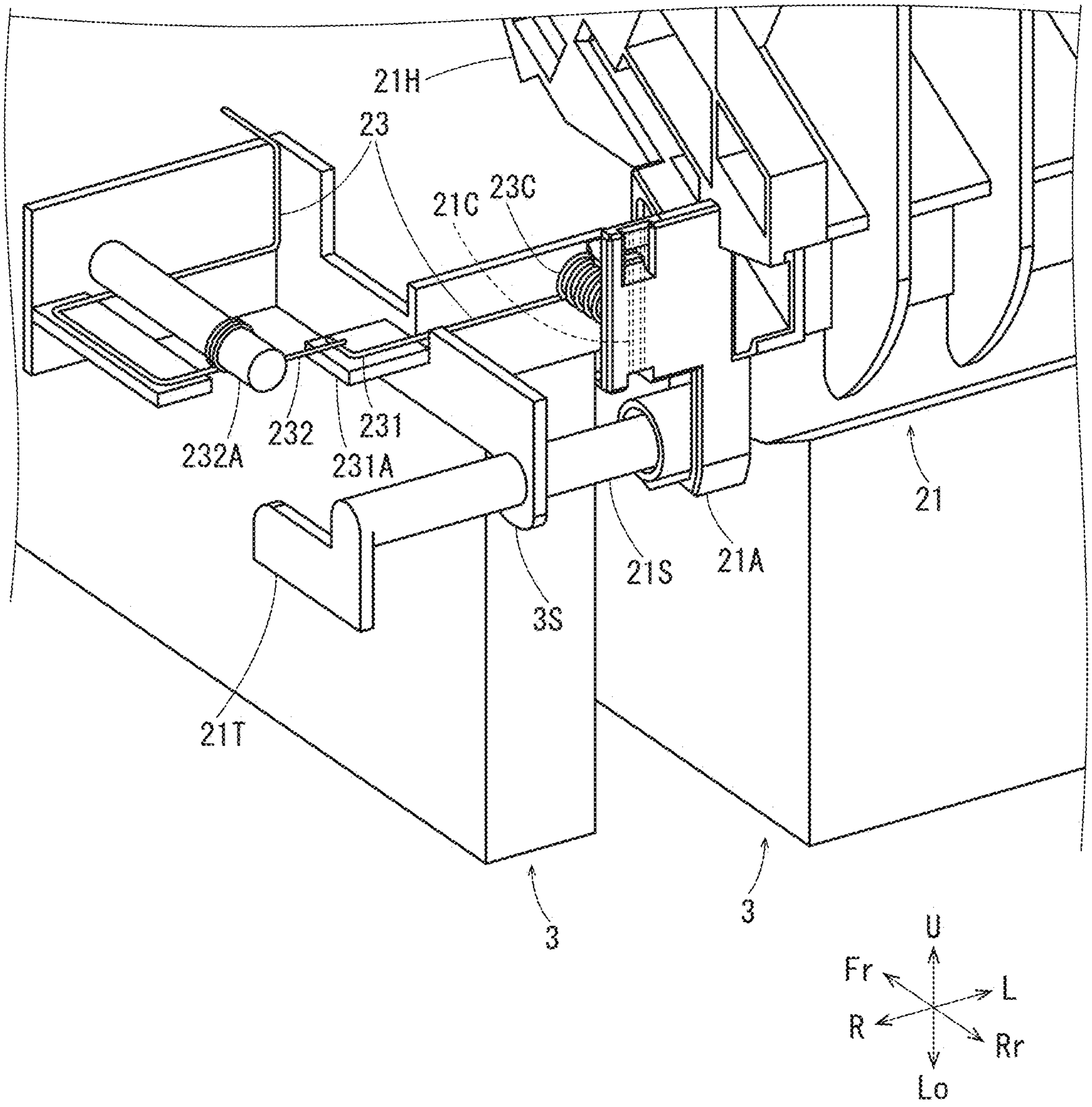
FIG. 6 is a perspective view showing a close state of the opening and closing unit according to the embodiment of the present disclosure.
Figure 7:
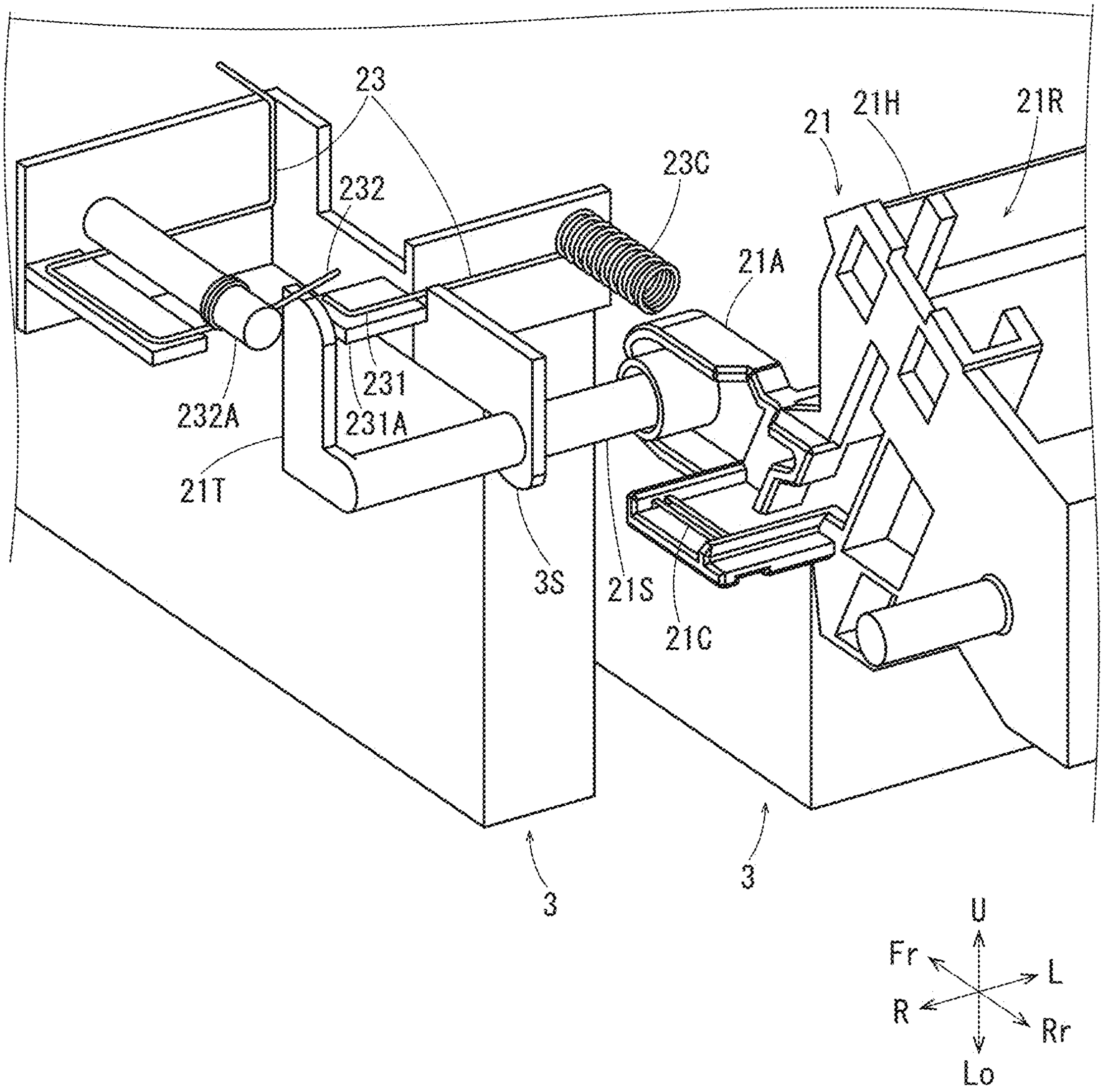
FIG. 7 is a perspective view showing the open state of the opening and closing unit according to the embodiment of the present disclosure.

Next, the configuration of the image forming apparatus 1 including an opening and closing unit 21 will be described in detail. FIG. 3 is a perspective view showing a state in which a cover 3C is opened. FIG. 4 is a perspective view showing a state in which the opening and closing unit 21 is opened. FIG. 5 is a perspective view showing the state in which the opening and closing unit 21 is opened. FIG. 6 is a perspective view showing a state in which the opening and closing unit 21 is closed. FIG. 7 is a perspective view showing the state in which the opening and closing unit 21 is opened.

[Cover] A rectangular opening 3A is provided on the rear surface of the body housing 3 (see FIG. 1 and FIG. 2). The opening 3A is provided with a rectangular cover 3C which can be opened and closed. The lower end portion of the cover 3C is coupled to the lower end portion of the opening 3A via a hinge 3H. The cover 3C is opened and closed in the front-and-rear direction around the hinge 3H. By opening the cover 3C, it is possible to remove the sheet S jammed in the conveyance path 10 and to perform maintenance of the inside.

[Opening and Closing Unit] An opening and closing unit 21 (see FIG. 2, FIG. 3 and FIG. 4) is provided on the front side of the cover 3C. The opening and closing unit 21 includes a housing 21H which longitudinal direction is along the left-and-right direction. The housing 21H has a concave storage portion 21R (see FIG. 5 and FIG. 7) opened in a direction intersecting the left-and-right direction. In the storage portion 21R, the secondary transfer roller 152 is stored with its axial direction along the left-and-right direction. Arm portions 21A (see FIG. 5 to FIG. 7) protruding in a direction crossing the left-and-right direction are provided at both left and right end portions of the housing 21H. Shafts 21S protrude leftward and rightward from the distal ends of the left and right arm portions 21A, respectively. The right and left shafts 21S are supported by shaft support portions 3S provided in the body housing 3. The opening and closing unit 21 is swingable around the shafts 21S.

The body housing 3 (see FIG. 2) is provided with a plate-like member 10P1 facing the front surface of the opening and closing unit 21. When the opening and closing unit 21 is closed, the conveyance path 10 is formed by the plate-like member 10P1 and the front surface of the opening and closing unit 21. A plate-like member 10P2 facing the rear surface of the opening and closing unit 21 is provided on the inner surface of the cover 3C. When the cover 3C is closed, the plate-like member 10P2 and the rear surface of the opening and closing unit 21 form the inversion conveyance path 10R.

When the cover 3C is opened, the opening and closing unit 21 can be opened and closed to the opening 3A. FIG. 2, FIG. 3 and FIG. 6 show a state in which the opening and closing unit 21 is closed. In this case, the opening and closing unit 21 is stored in the body housing 3. When the opening and closing unit 21 is closed, the secondary transfer roller 152 comes into contact with the intermediate transfer belt 15B (see FIG. 2).

On the other hand, FIG. 4, FIG. 5, and FIG. 7 show a state in which the opening and closing unit 21 is opened. In this case, the opening and closing unit 21 is exposed from the opening 3A to the outside of the body housing 3. When the opening and closing unit 21 is opened, the secondary transfer roller 152 is separated from the intermediate transfer belt 15B (see FIG. 4 and FIG. 5) and exposed to the outside.

A transfer roller side contact 21C (see FIG. 5 to FIG. 7) is provided at the right end portion of the housing 21H. The transfer roller side contact 21C is an electric contact connected to the secondary transfer roller 152. A power supply line 23 for applying a high voltage from a high-voltage power supply board (not shown) to the secondary transfer roller 152 is provided inside the body housing 3. A power supply line side contact 23C is provided at an end portion of the power supply line 23. A coil spring made of metal is used as the power supply line side contact 23C. The power supply line side contact 23C is fixed to the lower right portion of the opening 3A with its extension and compression direction along the front-and-rear direction. When the opening and closing unit 21 is closed, the transfer roller side contact 21C is pressed against the power supply line side contact 23C.

The power supply line 23 has a first contact 231 and a second contact 232 closer to the high-voltage power supply board than the power supply line side contact 23C. The first contact 231 is connected to the power supply line side contact 23C. The first contact 231 is attached to an upper surface of a plate-like first contact support portion 231A provided in the body housing 3. The second contact 232 is connected to the high-voltage power supply board. The second contact 232 is attached to a second contact support portion 232A provided in the body housing 3. The second contact support portion 232A is a rod-shaped portion whose longitudinal direction is along the front-and-rear direction. The power supply line 23 is wound around the second contact support portion 232A, and a part of the power supply line 23 functions as a torsion coil spring. The second contact 232 is disposed above the first contact 231. The second contact 232 is biased toward the first contact 231 by the elastic force of the power supply line 23.

A contact portion 21T protruding in a direction crossing the axial direction is provided at the right end portion of the shaft 21S. The contact portion 21T is integrated with the shaft 21S and swings with the rotation of the shaft 21S. When the opening and closing unit 21 is opened, the contact portion 21T swings in the clockwise direction in FIG. 6 and FIG. 7, and when the opening and closing unit 21 is closed, the contact portion 21T swings in the counterclockwise direction.

When the opening and closing unit 21 is closed (see FIG. 6), the contact portion 21T is located below the second contact 232, and is separated from the second contact 232. In this case, the second contact 232 is pressed against the first contact 231 by the elastic force of the power supply line 23.

On the other hand, when the opening and closing unit 21 is opened (see FIG. 7), the contact portion 21T swings upward with the rotation of the shaft 21S, and the tip portion of the contact portion 21T pushes the second contact 232 upward and separates it from the first contact 231. Conventionally, when the opening and closing unit 21 is opened, the power supply line side contact 23C and the transfer roller side contact 21C are exposed, and there is a risk of a short circuit if the user accidentally touches these contacts. Therefore, an interlock switch interlocking with the opening and closing of the opening and closing unit 21 has been conventionally provided to prevent the short circuit, but the interlock switch is expensive, and therefore, there is a disadvantage that it is difficult to reduce the cost of the image forming apparatus 1. On the other hand, in the present embodiment, since the contact portion 21T of the opening and closing unit 21 separates the second contact 232 from the first contact 231, it is possible to prevent the short circuit of the electric contact when the secondary transfer roller 152 is separated without using the interlock switch.

The image forming apparatus 1 according to the present embodiment described above includes the body housing 3 having the opening 3A; the opening and closing unit 21 which can be opened and closed in the opening 3A; the image carrier (the intermediate transfer belt 15B) which is provided in the body housing 3, and carries the toner image; the transfer roller (the secondary transfer roller 152) which is provided in the opening and closing unit 21, comes into contact with the image carrier when the opening-and-closing unit 21 is closed, and separates from the image carrier when the opening and closing unit 21 is opened; the power supply line 23 which supplies power to the transfer roller; the power supply line side contact 23C which is provided at an end portion of the power supply line 23; and the transfer roller side contact 21C which is provided in the transfer roller 152, comes into contact with the power supply line side contact 23C when the opening-and-closing unit 21 is closed, and separates from the power supply line side contact 23C when the opening and closing unit 21 is opened. The power supply line 23 includes the first contact 231, and the second contact 232 which can be in contact with the first contact 231 and separate from the first contact 231. The opening and closing unit 21 includes the contact portion 21T which comes into contact with the second contact 232 and moves the second contact 232. The contact portion 21T makes the second contact 232 come into contact with the first contact 231 when the opening and closing unit 21 is closed, and makes the second contact 232 separate from the first contact 231 when the opening and closing unit 21 is opened. According to this configuration, it is possible to prevent the short circuit of the electric contact when the secondary transfer roller 152 is separated without using the interlock switch.

According to the image forming apparatus 1 according to the present embodiment, the second contact 232 comes into contact with the first contact 231 by the elastic force when the opening and closing unit 21 is closed, and the contact portion 21T separates the second contact 232 from the first contact 231 when the opening and closing unit 21 is opened. According to this configuration, when the opening and closing unit 21 is closed, the second contact 232 can surely be brought into contact the first contact 231.

According to the image forming apparatus 1 according to the present embodiment, when the opening and closing unit 21 is closed, the second contact 232 comes into contact with the first contact 231 by the elastic force of the power supply line 23. According to this configuration, since it is not necessary to provide a member for biasing the second contact 232, a number of components can be suppressed.

According to the image forming apparatus 1 according to the present embodiment, the opening and closing unit 21 is swingable around the shaft 21S supported by the body housing 3, and the contact portion 21T is provided on the shaft 21S. According to this configuration, the second contact 232 can be separated from the first contact 231 in a simple configuration.

The above embodiments may be modified as follows.

In the above embodiment, an example of applying the present disclosure to the color printer is shown, but the e present disclosure may be applied to a monochrome printer. In this case, the image carrier is a photosensitive drum 11.

In the above embodiment, the contact portion 21T is provided on the shaft 21S, but the contact portion 21T may be swung via a link mechanism that operates in conjunction with the rotation of the shaft 21S.

In the above embodiment, the second contact 232 is brought into contact with the first contact 231 by the elastic force of the power supply line 23, but the second contact 232 may be brought into contact with the first contact 231 by using a biasing member such as a spring.

In the above embodiment, the second contact 232 comes into contact with the first contact 231 by elastic force when the opening and closing unit 21 is closed, and the contact portion 21T separates the second contact 232 away from the first contact 231 when the opening and closing unit 21 is opened, but, the second contact 232 may be separated from the first contact 231 by elastic force when the opening and closing unit 21 is opened, and the contact portion 21T may be configured such that the second contact 232 is pressed against the first contact 231 when the opening and closing unit 21 is closed.

In the above-described embodiment, the opening and closing unit 21 swings around the shaft 21S, but the opening and closing unit 21 may be configured to slide in the front-and-rear direction.

The invention claimed is:

1. An image forming apparatus comprising:

a body housing having an opening;

an opening and closing unit which can be opened and closed in the opening;

an image carrier which is provided in the body housing, and carries a toner image;

a transfer roller which is provided in the opening and closing unit, comes into contact with the image carrier when the opening and closing unit is closed, and separates from the image carrier when the opening and closing unit is opened;

a power supply line which supplies power to the transfer roller;

a power supply line side contact which is provided at an end portion of the power supply line; and a transfer roller side contact which is provided in the transfer roller, comes into contact with the power supply line side contact when the opening and closing unit is closed, and separates from the power supply line side contact when the opening and closing unit is opened, wherein the power supply line includes:

a first contact, and a second contact which can be in contact with the first contact and separate from the first contact, the opening and closing unit includes a contact portion which comes into contact with the second contact and moves the second contact, and the contact portion makes the second contact come into contact with the first contact when the opening and closing unit is closed, and makes the second contact separate from the first contact when the opening and closing unit is opened.

2. The image forming apparatus according to claim 1, wherein the second contact comes into contact with the first contact by an elastic force when the opening and closing unit is closed, and the contact portion separates the second contact from the first contact when the opening and closing unit is opened.

3. The image forming apparatus according to claim 2, wherein when the opening and closing unit is closed, the second contact comes into contact with the first contact by the elastic force of the power supply line.

4. The image forming apparatus according to claim 2, wherein the opening and closing unit is swingable around a shaft supported by the body housing, and the contact portion is provided on the shaft.

* * * * *